April 28, 1936.                J. L. ANDERSON                2,038,820
                          CUTTING OR WELDING MACHINE
                    Filed April 26, 1933          6 Sheets-Sheet 1

April 28, 1936.  J. L. ANDERSON  2,038,820

CUTTING OR WELDING MACHINE

Filed April 26, 1933  6 Sheets—Sheet 2

Fig. 3.

INVENTOR
James L. Anderson
BY J. F. Brandenburg
ATTORNEY

April 28, 1936.  J. L. ANDERSON  2,038,820
CUTTING OR WELDING MACHINE
Filed April 26, 1933   6 Sheets—Sheet 4

April 28, 1936.  J. L. ANDERSON  2,038,820
CUTTING OR WELDING MACHINE
Filed April 26, 1933  6 Sheets-Sheet 5

INVENTOR
James L. Anderson
BY J. F. Brandenburg
ATTORNEY

Patented Apr. 28, 1936

2,038,820

UNITED STATES PATENT OFFICE 2,038,820

CUTTING OR WELDING MACHINE

James L. Anderson, Closter, N. J., assignor to Air Reduction Company, Incorporated, New York, N. Y., a corporation of New York Application April 26, 1933, Serial No. 668,008

19 Claims. (Cl. 266—23)

This invention relates to cutting or welding machines of the type having a torch supported for universal movement in a plane and connected with a driving wheel or roller which follows a drawing or template and causes the torch to follow a similar path.

In machines which have the torch supported by one or more jointed arms, the area over which the torch can operate is limited by the length of the arms. When such machines are designed with long arms for cutting or welding over large areas, the base for supporting the arms is necessarily heavy to withstand the weight and leverage of the arms, and the cost of the machine is materially greater than for a similar machine for working over a somewhat smaller area.

It is an object of this invention to provide a machine having a torch and driving wheel or roller supported on jointed arms for universal movement in a plane, and a supporting base for the arms movable to increase the area over which the torch can operate. Another object is to provide such a machine with connections between the torch and the driving wheel or roller which cause the torch to move in a path similar to that traveled by the driving wheel or roller whether the supporting base for the arms is stationary or moving.

Another object of the invention is to provide a torch and tracer supported for universal movement in a plane by jointed arms pivotally connected to a carriage, and automatic control mechanism for moving the carriage to increase the range of operation of the torch whenever the jointed arms approach the limit of their angular movement.

The invention makes it possible for a cutting or welding machine to operate over an area of much greater size than with jointed arms pivotally connected to a fixed base. The invention, therefore, reduces the size and cost of the equipment required for cutting or welding over large areas, and particularly over long areas such as encountered when working with beams.

Other objects, features and advantages of the invention will appear or be pointed out as the description proceeds.

In the accompanying drawings, forming part hereof.

Figure 1:
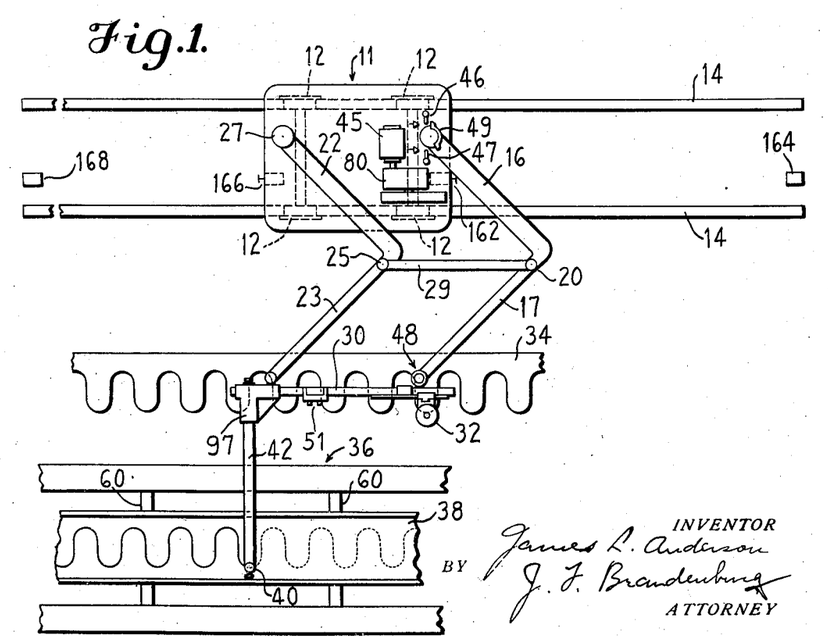
Fig. 1 is a diagrammatic plan view of a cutting machine embodying the invention, the machine being shown with a template, work table, and work located in position for a cutting operation.

A truck or carriage 11 has flanged wheels 12 which run on a track 14. A jointed arm is supported by the carriage and comprises a link 16, and a link 17 connected at one end to the link 16 by a pivotal connection 20 and connected at its other end to a bearing sleeve 21. The bearing sleeve 21 is supported by the carriage 11 for pivotal movement about an axis parallel to the axis of the pivotal connection 20.

Another jointed arm includes links 22 and 23, connected by the joint or pivotal connection 25, and a bearing sleeve 27 which connects the link 22 with the carriage 11. Cross links 29 and 30 are pivotally connected at opposite ends to the jointed arms so that the entire link assembly moves as a folding parallelogram.

A tracer or template follower 32 is supported by the cross link 30 for universal movement in a plane with respect to the carriage. A template 34 extends lengthwise of the track. As the template follower 32 moves along the outline of the template, the cross link 30 moves parallel to itself and all points on the cross link follow paths similar to that of the template follower.

A work table 36 extends parallel to the track 14 and supports an I-beam 38 or other piece of work to be cut. A cutting torch 40 is connected to the cross link 30 by a rigid arm 42 so that the torch 40 is spaced horizontally from the template follower and moves along a path similar to that of the template follower. This horizontal spacing of the torch and template follower permits the use of templates in substantially the same plane as the work, the arm 42 being long enough to prevent the torch from moving over the outer edge of the template when the template follower moves in close to the carriage or track. The machine shown in Fig. 1 is capable of operating with templates and work of much greater dimensions, in the direction transverse of the track, than the template and work illustrated in Fig. 1. The positions of the template follower and torch can be interchanged if the template and work are also interchanged.

The carriage 11 is driven by a reversible electric motor 45 mounted on the carriage and operatively connected to the wheels 12. Many other types of power mechanism are suitable for moving the carriage along the track. The motor operates intermittently to move the carriage during a cutting or welding operation. This movement is controlled automatically by switches 46, 47, and 48 operated by the angular movement of the jointed arms.

The tracer or template follower 32 and torch 40 have universal movement in a plane while all of the links of the supporting structure are free to turn on their pivots. The switches 46, 47 and 48 constitute control means for causing the carriage to move along the track whenever a link approaches the limit of its pivotal movement in either direction.

When the link 16 moves counter-clockwise in Fig. 1 beyond a definite angle, a cam 49 on the link 16 closes the switch 46 and causes the motor 45 to drive the carriage toward the right. The carriage starts slowly and accelerates until it is traveling at a faster speed than that of the template follower along the edge of the template. This faster speed of the carriage causes the link 16 to move clockwise about its pivotal connection to the carriage, and thus prevents the link 16 from reaching the limit of its angular movement.

The switch 46 springs open when the carriage has moved enough to swing the link cam 49 away from the switch. The slow acceleration of the carriage causes the carriage to move for a considerable distance along the track before the link cam 49 permits the switch to open. Such operation avoids repeated opening and closing of the switches 46 and 47 at very short intervals. Another advantage of the slow acceleration is that it insures against jarring the links and a consequent rough place in the cut.

When the link 16 swings to the left (clockwise) in Fig. 1 beyond a definite angle, the cam 49 closes the switch 47 and starts the carriage moving to the left so that the pivotal axis of the link 16 is moved to the left faster than the speed of the template follower, and the link 16 is thereby swung to the right with respect to the carriage.

The switch 48 is operated by movement of the link 17 beyond a maximum and a minimum angle with the cross link 30. As the template follower 32 moves toward the right in Fig. 1, while the carriage 11 is stationary, the acute angle between the link 17 and cross link 30 increases. When this acute angle exceeds a definite predetermined value, the switch 48 closes a circuit to supply power to the motor to drive the carriage to the right at a speed faster than that of the template follower so that the acute angle between the link 17 and cross link 30 decreases.

When the template follower 32 moves toward the left in Fig. 1 while the carriage 11 is stationary, the acute angle between the links 17 and 30 decreases. When this angle becomes less than a predetermined value, the switch 48 closes a circuit to supply power to drive the carriage 11 to the left at a speed faster than that of the template follower so that this acute angle between the links 17 and 30 increases. The construction of the switch 48 will be explained in detail in the description of Figs. 6–8.

The automatic operation of the switches 46, 47 and 48 keeps the angle between the links 16 and 17 within definite limits, which are less than the angular movement permitted by the pivotal connections of the links 16 and 17. During a cutting or welding operation the movement of the carriage is controlled by either of the links 16 and 17 which first moves into switch operating position. The position of the template follower transversely of the track determines which of the links 16 and 17 will control the movement of the carriage.

A switch box 51 on the cross link 30 has manually operated, momentary contact switches for causing the carriage to move in either direction at any time. These switches will be explained in more detail in the description of Fig. 9.

Figure 2:
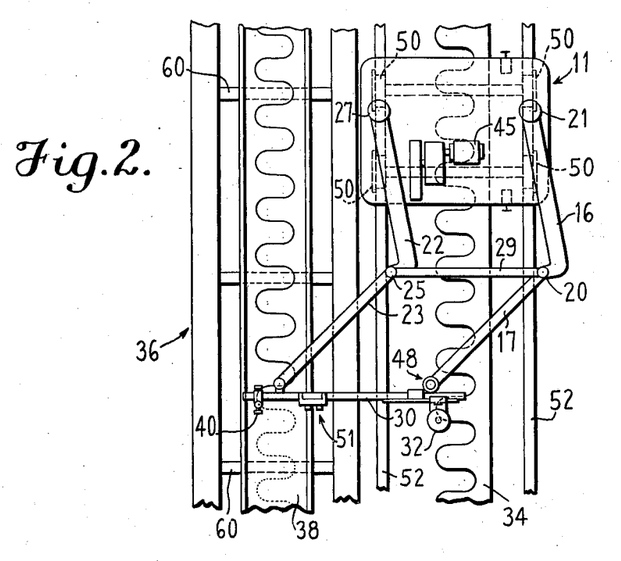
Fig. 2 is a diagrammatic plan view similar to Fig. 1, showing a modified form of the invention.

Fig. 2 shows a modified form of the invention in which the carriage 11 has wheels 50 on axles at right angles to the axles of Fig. 1. The wheels 50 run on a track 52 which is of wider tread than the track 14. The template 34 is located between the rails of the track 52. The work table 36 extends parallel to the track 52 and supports the I-beam 38 or other work. The torch 40 can be directly connected to the cross link 30 in the modified construction shown in Fig. 2, because the length of the cross link gives the necessary spacing of the torch and template follower. In the modified form of the invention shown in Fig. 2, the positions of the work and template can be interchanged if the torch and tracer are also interchanged. This form of the invention has the advantage of requiring less floor space than the embodiment of Fig. 1. The location of the parts illustrated in Fig. 1 permits easier removal and replacement of the template and does not limit the width of the template by the tread of the track. The switches in Fig. 2 are set to operate to move the carriage away from the cross link 30 when the link moves in close to the carriage, and to move the carriage in the opposite direction when the links 16 and 17 approach positions paralleling the track 52.

Figure 3:
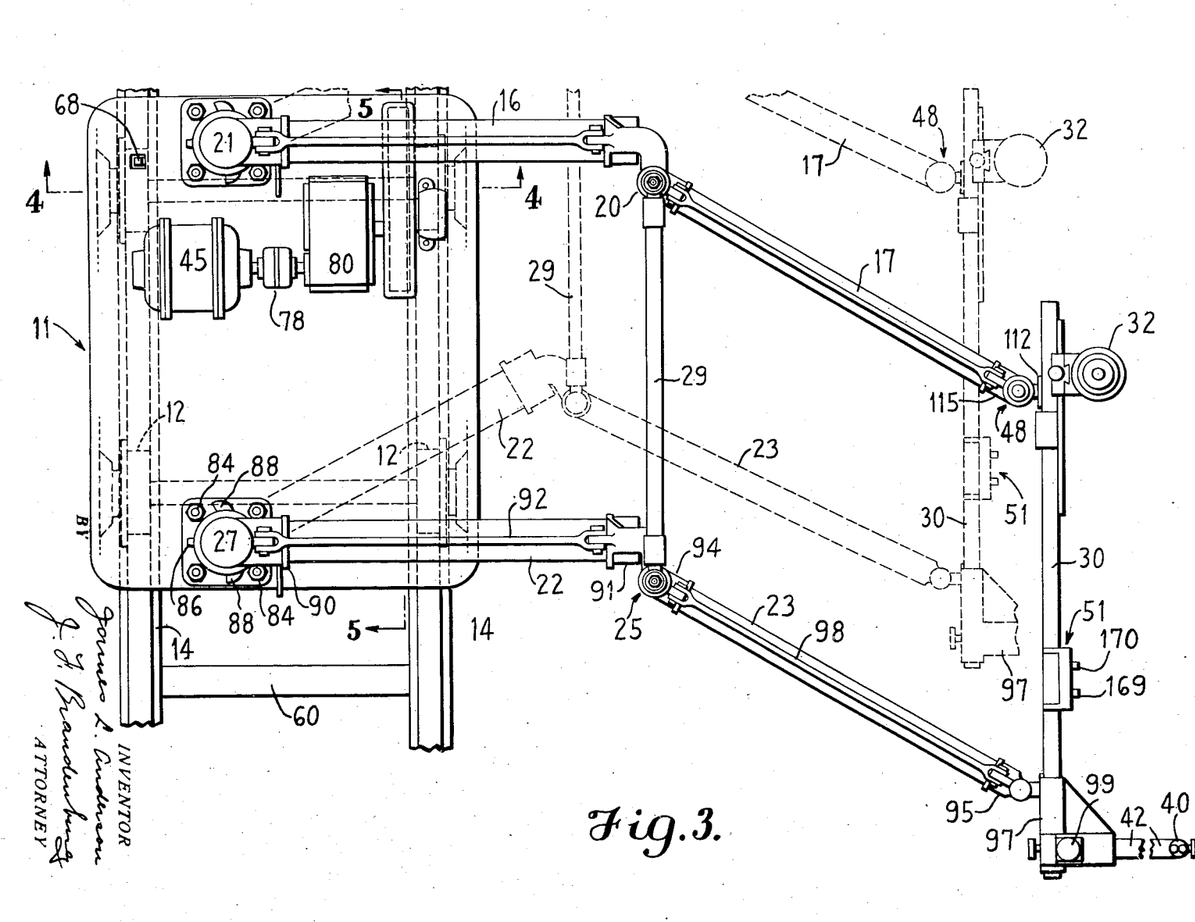
Fig. 3 is an enlarged plan view of the cutting machine shown in Fig. 1.
Figure 4:
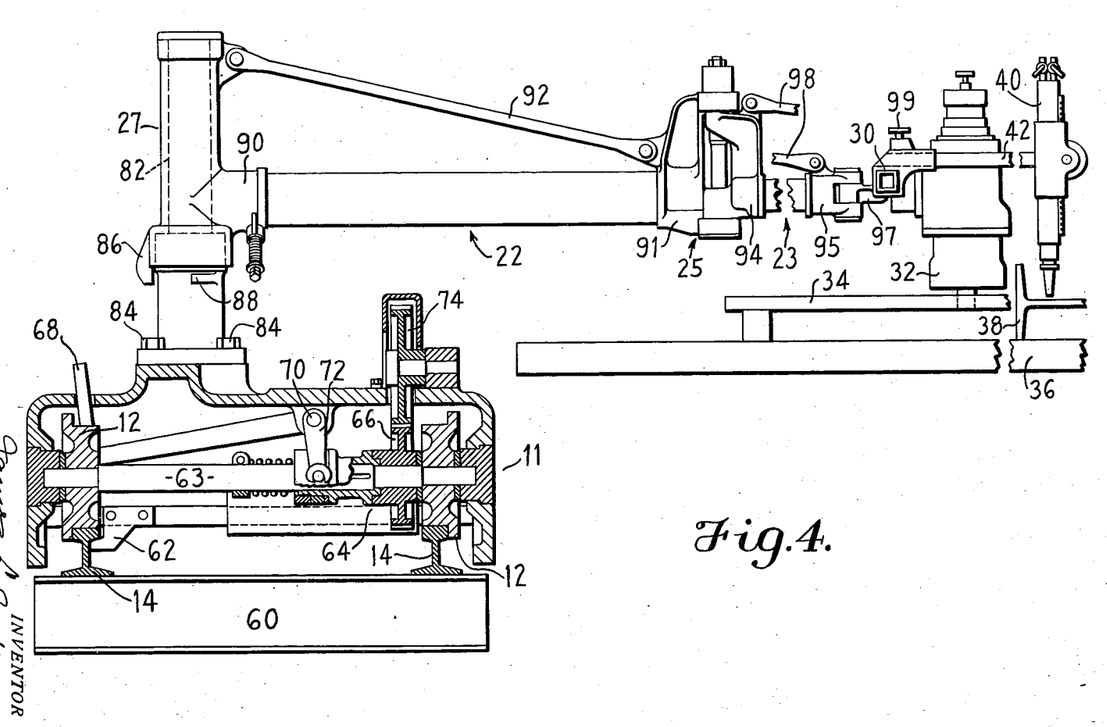
Fig. 4 is an enlarged view of the machine shown in Fig. 3, with the carriage shown in section along the line 4—4 of Fig. 3.
Figure 5:
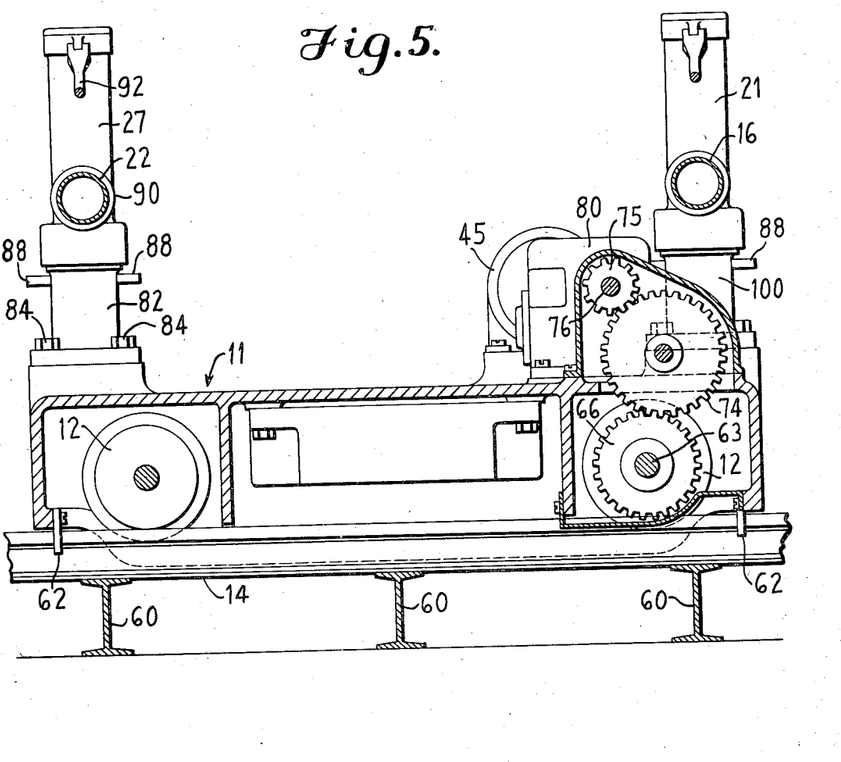
Fig. 5 is an enlarged sectional view on the line 5—5 of Fig. 3.

The details of construction of the invention are shown in Figs. 3–5. The rails of the track 14 are supported by ties 60, or other suitable spacing means. A guard 62 extends under the head of one rail, as shown in Fig. 4. This guard does not touch the rail during the ordinary operation of the machine. If an abnormal load is placed or falls on the torch and template supporting linkage, however, it is impossible for the carriage 11 to tip over because a very slight tipping causes the guard 62 to move up against the under side of the rail head and prevent further tipping.

The wheels 12 at one end of the carriage are secured to an axle 63, which is driven through a jaw clutch 64 from a gear 66. This gear is free to rotate on the axle 63 when the clutch is disengaged. A handle 68 pivotally connected to the carriage at 70 operates the clutch 64 through a clutch yoke 72. The handle 68 is operated to disengage the clutch when it is desirable to push the carriage along the track at a faster speed than when moved by the motor. Rapid movement of the carriage is often desirable when initially locating the mechanism preparatory to beginning a cutting or welding operation, or when moving the machine out of the way to permit a crane to remove the work or template.

The gear 66 is driven by an idler gear 74 (Fig. 5). This idler gear is driven by a pinion 75, which is secured to a shaft 76. The motor 45 drives the shaft 76 through a coupling 78 (Fig. 3) and reduction gearing 80.

A post 82 (Fig. 4) is secured to the carriage 11 by bolts 84. The bearing sleeve 27 is supported by the post 82. A lug 86 extending downward from the bearing sleeve 27 contacts with abutments 88 on the post 82 to limit the angular movement of the bearing sleeve 27 on the post.

The link 22 is of tubular section and fits into a T branch 90 of the bearing sleeve. The link 22 is rigidly connected to the T branch. The other end of this link extends into and is secured to a casting 91. The link 22 is braced by a tie rod 92 fastened to the bearing sleeve near its top end and fastened to the casting 91.

The link 23 is of tubular section, and preferably of smaller section than the link 22. End castings 94 and 95 are secured to the tubular portion of the link 23. The end casting 94 is pivotally connected to the casting 91, and the end casting 95 is pivotally connected to a bracket 97 on the bar or cross link 30. A tie rod 98 connects at its opposite ends with the end castings 94 and 95.

The arm 42 fits into an opening in the bracket 97 and is rigidly held by a set-screw 99. The torch 40 is supported at the outer end of the arm 42 by a conventional torch holder permitting raising and lowering of the torch with respect to the work.

The link 16 is supported by a post 100 (Fig. 5), similar to the post 82, but secured at the other end of the carriage 11 from the post 82, as shown in Fig. 5. The construction and connections of the links 16 and 17 are similar to links 22 and 23, respectively.

The template follower 32 shown in the drawings is a magnetic follower similar to that shown in my Patent No. 1,839,170, dated Dec. 29, 1931, but other template followers or tracers can be used.

Figure 6:
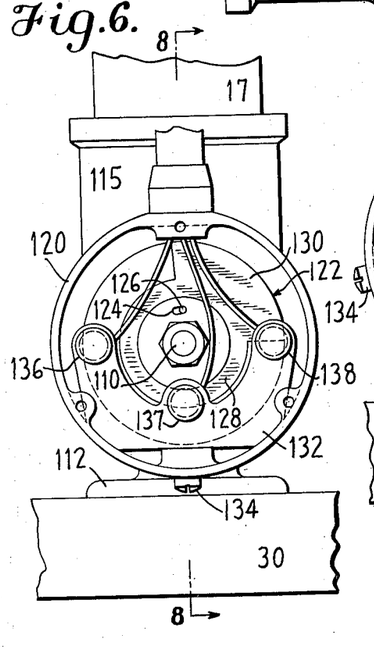
Figs. 6 and 7 are enlarged top plan views of the switch and its containing cup, with the cover of the cup removed.
Figure 7:
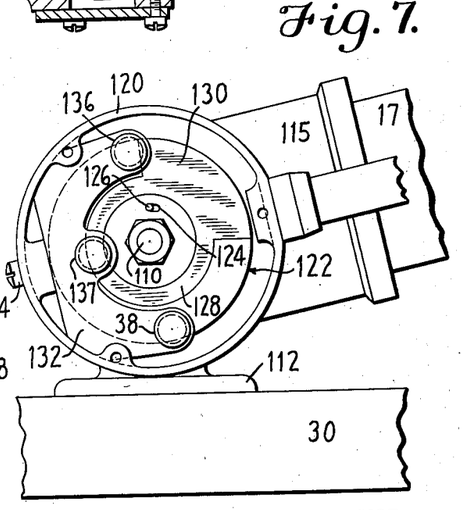
Figure 8:
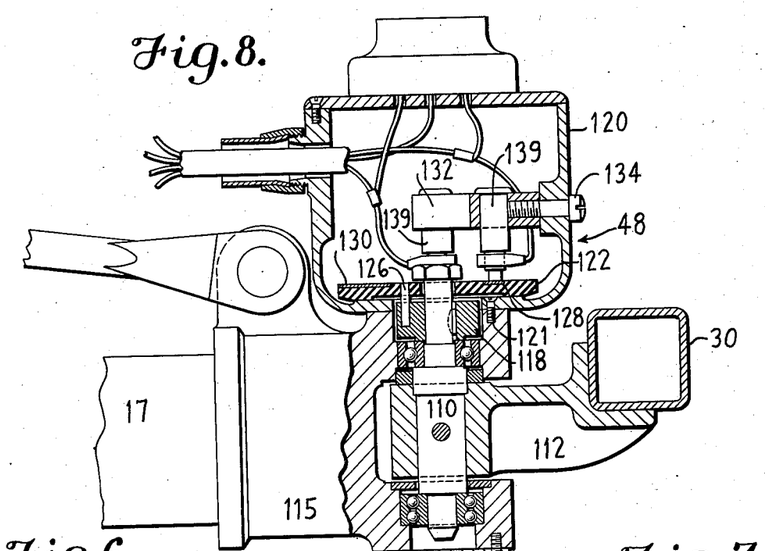
Fig. 8 is a sectional view on the line 8—8 of Fig. 6, with the cover on the cup.

The construction of the switch 48 is shown in Figs. 6–8. Referring particularly to Fig. 8, a shaft 110 is rigidly connected to a bracket 112 which is secured to the bar or cross link 30. The shaft 110 turns in bearings in an end casting 115 of the link 17 and constitutes the pivotal connection between the link 17 and cross link 30. A collar 118 is keyed or otherwise secured to the upper portion of the shaft 110.

A cup 120 is fastened to the end casting 115 by screws 121. A disc 122 is of insulating material and has a central opening through which the upper end of the shaft 110 extends. The disc rests on the bottom of the cup 120 and has an arcuate slot 124 (Figs. 6 and 7) extending approximately 5°. A pin 126 is rigid with the collar 118 and freely movable in the slot 124. The pin 126 and slot 124 constitute a lost motion connection between the disc 122 and collar 118.

The disc 122 has a conductor ring 128 concentric with the axis of the shaft 110. The conductor ring 128 has a wide sector 130 of slightly more than 90°.

A brush holder 132 is connected to the cup by a screw 134. Three brushes 136, 137 and 138 are supported by the brush holder and are insulated therefrom by insulating bushings 139.

When the angular relation between the link 17 and cross link 30 changes, the disc 122 turns with respect to the cup 120 and brush holder 132. The brush 137 is in position to contact with the narrow portion of the conductor ring 128, and therefore contacts with the conductor ring for all angular positions of the link 17 and cross link 30. The brushes 136 and 138 are located further from the shaft 110 and contact with the disc 122 outside of the conductor ring 128 except when the wide sector 130 of the ring is under either of these brushes.

When the link 17 makes an angle of substantially 90° with the cross link 30, as shown in Fig. 6, the brush 138 contacts with the wide sector 130 of the conductor ring and closes a circuit from the brush 138 through the conductor ring to the brush 137. The closing of this circuit causes the carriage motor to drive the carriage toward the right at a faster speed than that of the template follower, as explained in the description of Fig. 1. As the angle between the link 17 and cross link 30 becomes less, the cup 120 and brush holder 132 rotate about the axis of the shaft 110 as a center. The friction between the cup 120 and the bottom of the disc 122 causes the disc to rotate with the cup for approximately 5°, but after turning through this angle the end of the slot 124 strikes the pin 126 and the disc 122 is prevented from rotating further. The brush 138 is moved away from the wide sector 130 and into contact with the insulating portion of the disc 122, thus breaking the circuit and causing the carriage to stop.

If the bar or cross link 30 moves to the left until the link 17 makes an angle of approximately 12° with the cross link 30, the brush 136 will move into contact with the wide sector 130. When the brush 136 touches the wide sector 130, a circuit is closed from the brush 136 through the conductor ring 128 to the brush 137 and the carriage motor is operated to drive the carriage to the left at a speed faster than that of the template follower so that the angle between the link 17 and cross link 30 increases. The slot 124 permits the disc 122 to rotate with the cup 120 for approximately 5°. After this movement the pin 126 prevents the disc 122 from turning and the brush 136 moves onto the insulating portion of the disc 122, breaking the circuit and causing the carriage motor to stop.

After the carriage stops, the template follower may continue to move the cross link 30 to the left so that the angle between the link 17 and cross link 30 again decreases. The circuit to the carriage motor is not immediately closed, however, because the disc 122, cup 120, and brushes move as a unit for approximately 5°, after which the pin 126 prevents further movement of the disc and the brush 136 again moves into contact with the side sector 130 of the conductor ring. Thus, the lost motion of the pin and slot connection causes the circuit to remain closed while the angle between the link 17 and cross link 30 increases from 12° to slightly more than 17°, and prevents closing of the circuit again until the angle again decreases to 12°. This lost motion serves in a similar manner at the other limit of angular movement to prevent repeated opening and closing of the circuit at extremely short intervals. It will be understood that the values of the angles are illustrative, and that the machine can be designed so that the links swing through wider or narrower ranges of angular movement.

Figure 9:
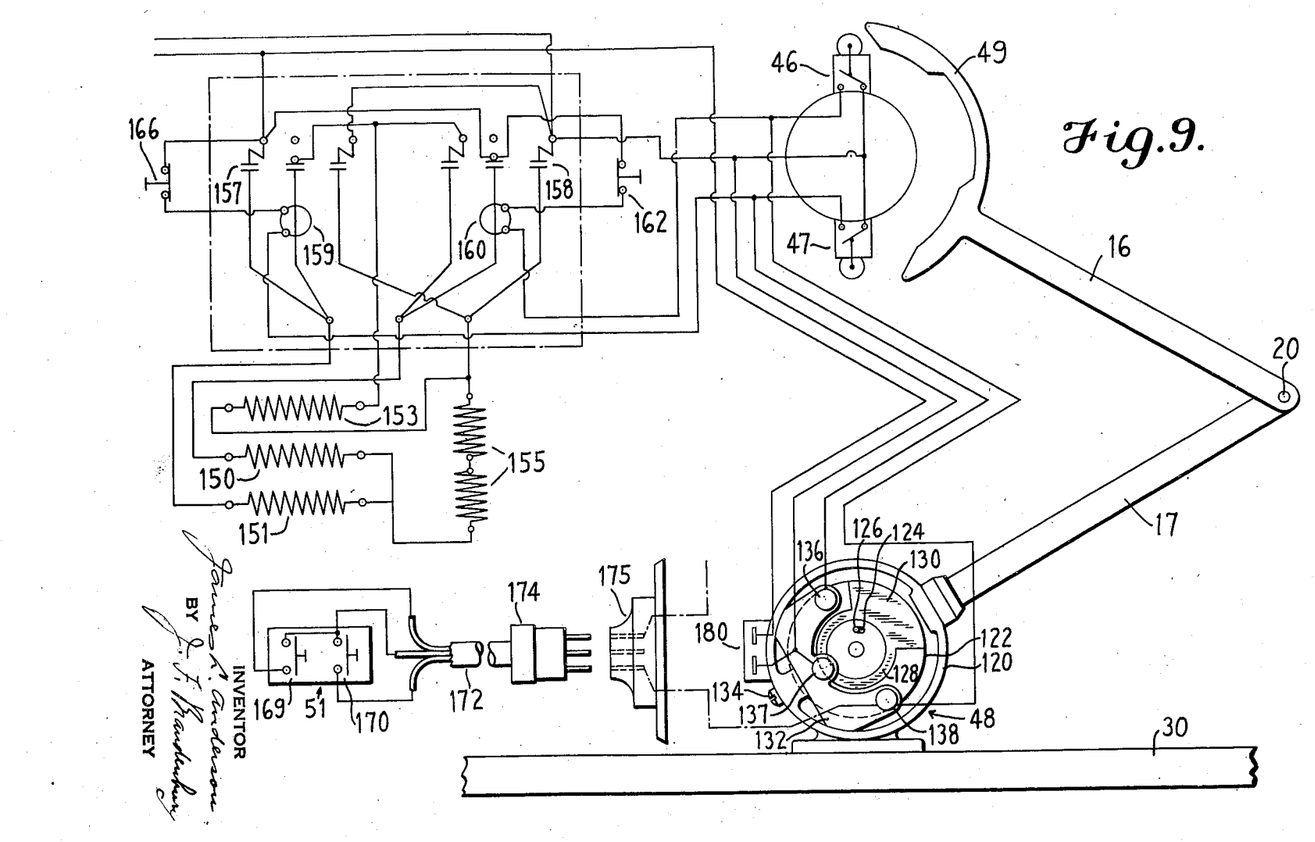
Fig. 9 is a wiring diagram for the machine.

Fig. 9 is a wiring diagram for the machine. Power is supplied to a motor winding 150 to drive the carriage to the right, and to a motor winding 151 to drive the carriage to the left. A coil 153 can be used to release a brake on the motor when the power is turned on. Many commercial motors are equipped with such magnetically released brakes, which prevent coasting of the motor when the power is cut off.

Resistance coils 155 in the motor circuit prevent rapid acceleration of the carriage. A gradual acceleration is desirable because it results in less frequent opening and closing of the control switches during a cutting or welding operation, and insures against jarring the torch when the carriage starts.

Power to the motor and the brake coil is controlled by two three-pole switches 157 and 158. Both of these switches are normally open and they are closed by magnets 159 and 160. The switch 46 and the brush 138 of the switch 48 are connected with the magnet 160, as shown, so that closing of either of these switches will supply power to energize the magnet 160 and close the switch 158 so that the motor drives the carriage to the right. A limit switch 162 is connected in series with the magnet 160 and is normally closed, but when the carriage reaches the right end of the track the limit switch strikes an abutment 164 (Fig. 1), which causes the switch to open and thus breaks the circuit through the magnet 159.

The switch 47 and the brush 136 of the switch 48 are connected with the magnet 159, as shown in Fig. 9, and closing of either of these switches supplies power to energize the magnet 159 and close the switch 157 so that the motor is operated to drive the carriage to the left. A normally closed limit switch 166 in series with the magnet 159 is opened by an abutment 168 when the carriage reaches the left end of the track.

The switch box 51 on the cross link 30 contains two normally open switches 169 and 170 which can be manually operated to supply power to the magnets 159 and 160, respectively. These switches are used to operate the motor to move the carriage one way or the other when positioning the torch or tracer before beginning a cut or for moving the carriage and arms out of the way after the work is finished.

The switches 169 and 170 are connected by a cable 172 to a plug 174 which fits into a socket 175 on the cover of the cup 120. This connection permits movement of the switch box 51 to another part of the machine, if desirable, or this manual control can be dispensed with entirely and later replaced without breaking any electrical connections other than those of the plug and socket.

The wires connecting with the brushes in the cup 120 pass through the tubular links 16 and 17 which protect the wires from injury. A cable for the motor of the tracer 32 can be plugged into a socket 180 on the side of the cup 120.

The operation of the invention has been explained in describing Figs. 1 and 2. The width of the area over which the torch can operate is determined by the reach of the jointed arms. The length of area can be made as long as necessary by extending the length of the track. The invention has been described as a cutting machine, but it can be readily adapted for welding, and other changes and modifications can be made, and various features of the invention used with or without other features without departing from the invention as defined in the claims.

I claim:

1. A cutting or welding machine comprising a carriage; a two-rail track; means extending from the carriage for supporting a torch and tracer for movement with respect to the carriage in any and changing directions over different areas, one of which lies between the rails of the track; and means for moving the carriage along the track during a cutting or welding operation.

2. A cutting or welding machine comprising a two-rail track; a wheeled truck movable along the track; supporting means including a jointed arm pivotally connected to the truck and extending beyond one end of the truck for supporting a torch and tracer in such relation to the carriage and each other that one moves over an area between the rails of the track, and both have universal movement in a plane with respect to the carriage; means for causing the torch and tracer to follow similar paths; and power driven mechanism for moving the truck along the track during a cutting or welding operation.

3. A cutting or welding machine comprising a carriage and means supporting the carriage for intermittent movement along a given course during a cutting or welding operation; means on the carriage for supporting a torch and tracer at horizontally spaced points for universal movement with respect to the carriage over parallel areas extending in the direction of movement of the carriage, and connections for causing the torch to move in a path similar to that followed by the tracer.

4. Cutting or welding apparatus comprising a track; a template extending lengthwise along the track; a work-supporting table extending lengthwise along the same portion of the track and spaced horizontally from the template; a carriage on the track; and supporting means extending from the carriage for supporting a template follower and torch for universal movement in a plane with respect to the carriage, the supporting means including connections for causing the torch to follow a path similar to that of the template follower whether the carriage is standing still or in intermittent motion.

5. In a cutting or welding machine, a movable truck; a jointed arm pivotally connected to the truck for supporting a template follower for movement with respect to the truck in any and changing directions in a plane; and power driving means for moving the truck during a cutting or welding operation if the links of the jointed arm swing beyond a predetermined minimum or maximum angle with each other.

6. A cutting or welding machine comprising a carriage; supporting means including a jointed arm pivotally connected to the carriage and supporting a tracer for universal movement in a plane with respect to the carriage; separate switch means actuated by angular movement at separate pivots of said supporting means; and power driving mechanism, controlled by said switch means, for moving the carriage during a cutting or welding operation.

7. A cutting or welding machine comprising a track; a carriage on the track; tracer supporting means pivotally connected to the carriage and including links pivotally connected together; power driving mechanism for moving the carriage along the track; and two control means for the driving mechanism, one of which is operated by angular movement of a link about its pivotal connection to the carriage, and the other of which is operated by relative movement between links of the supporting means.

8. A cutting or welding machine comprising a carriage; a jointed frame pivotally connected to the carriage for supporting a tracer; driving mechanism including an electric motor for moving the carriage; and switch means for controlling the supply of power to the motor including an electric switch in position to be operated by angular movement of a link of the frame at one of the pivot connections of the frame and another electric switch in position to be operated by angular movement of a link at another pivot connection of the frame.

9. A cutting or welding machine comprising a movable truck; a tracer support including two links pivotally connected together and one of which is pivotally connected to the truck; driving mechanism including an electric motor for moving the truck; and an electric switch associated with each of said links and controlling the power supply to the motor; one of the electric switches being located in position for operation by angular movement of its associated link with respect to the truck, and the other electric switch being located in position for operation by angular movement of its associated link with respect to another part of the tracer support.

10. A cutting or welding machine comprising a track; a truck movable along the track; a tracer support having pivot connections and including a jointed arm pivotally connected to the truck; driving mechanism including an electric motor for moving the truck in either direction along the track; electric switch means located in position for operation by angular movement of the jointed arm on its pivot connection to the truck in either direction beyond a given angle, to supply power to operate the motor to move the truck in the same direction as the arm; and other electric switch means located in position for operation by relative angular movement on another pivot connection of the tracer support.

11. A cutting or welding machine comprising a track; a truck movable along the track; a tracer support having pivot connections and including a jointed arm pivotally connected to the truck; driving mechanism including an electric motor for moving the truck in either direction along the track; electric switch means located in position for operation by angular movement of the jointed arm on its pivot connection to the truck in either direction beyond a given angle, to supply power to operate the motor to move the truck in the same direction as the arm; other electric switch means located in position for operation by relative angular movement on another pivot connection of the tracer support; limit electric switch means operated by movement of the truck to stop the motor when the truck approaches close to either end of the track; and abutments for operating the last-mentioned electric switch means.

12. In a cutting or welding machine, a carriage; a tracer support including two jointed arms pivotally connected to the carriage at spaced points; connections between the arms; power mechanism for driving the carriage during a cutting or welding operation; means for controlling the operation of the power mechanism including a control operated by relative movement of one arm about its pivotal connection with the carriage; and another control operated by angular movement of one arm with respect to a connection between the arms.

13. Cutting or welding apparatus including a carriage; two pointed arms pivotally connected to the carriage at spaced points; two cross links pivotally connected to the jointed arms to form a folding parallelogram; a template follower supported by the outer cross link for movement with respect to the carriage in any and changing directions; a torch holder connected with said outer cross link for movement over a path similar to that of the template follower; driving mechanism including an electric motor for moving the carriage; and electric switches for controlling the supply of power to the electric motor including a switch operated by pivotal movement of the jointed arms with respect to the carriage, and another switch operated by pivotal movement of one of the cross links with respect to the jointed arms.

14. In a cutting or welding machine, a carriage; a tracer support including two jointed arms pivotally connected to the carriage at spaced points; connections between the arms; reversible power mechanism for moving the carriage in either direction during a cutting or welding operation; control means for the power mechanism including control means operated by pivotal movement of one arm with respect to the carriage beyond a definite angular position in either direction to cause the carriage to move along the track in that direction, and other control means operated by movement of one arm with respect to one of said connections to cause the carriage to move in a direction to increase the range of the tracer in the direction in which it is moving.

15. Cutting or welding apparatus including a carriage; means for supporting a tracer and torch for similar movement with respect to the carriage in any and changing directions, said means including two jointed arms pivotally connected to the carriage at spaced points; two cross links pivotally connected to the jointed arms to form a folding parallelogram; driving mechanism including a reversible electric motor for moving the carriage; electric switch means operated by pivotal movement of the jointed arms with respect to the carriage beyond a given angle in both directions for controlling the operation of the motor in opposite directions; and other electric switch means operated by the links to control the operation of the motor in opposite directions when the angle between a cross link and a link of a jointed arm increases or decreases beyond a given range.

16. A cutting or welding machine including a carriage; means carried by the carriage for supporting a tracer and torch for universal movement in a plane with respect to the carriage, said means including connections for causing the torch and tracer to follow similar paths; and automatic means for moving the carriage during a cutting or welding operation including a device for causing the carriage to start with a gradual acceleration.

17. Cutting or welding apparatus including a truck; supporting means and connections carried by the truck for supporting a tracer and torch for movement over similar paths in any and changing directions with respect to the truck whether stationary or in motion; and automatic power mechanism including an electric motor for driving the truck, and means to prevent rapid acceleration of the electric motor.

18. Cutting or welding apparatus including a truck; supporting means carried by the truck for supporting a tracer and torch for movement over similar paths in any and changing directions with respect to the truck whether stationary or in intermittent motion; power mechanism including a reversible electric motor for driving the truck in opposite directions; automatic means for controlling the operation of the motor in either direction during a cutting or welding operation; and a resistance permanently connected in the motor circuit and of such a character that the speed of the motor increases gradually when started in either direction.

19. Cutting or welding apparatus comprising a carriage; wheels for supporting the carriage on a track extending longitudinally of the carriage; two upwardly extending posts secured to the carriage at spaced points; two jointed arms extending beyond one side of the carriage, one arm being supported by each post for oscillation about the axis of the post; supporting means adjacent the outer ends of the jointed arms for supporting a tracer and torch; and a guard on the carriage for extending under the track to prevent overturning of the carriage transversely from excessive load on the jointed arms; and connections for causing the torch to move in a path similar to that followed by the tracer.

JAMES L. ANDERSON.